United States Patent
Wagner et al.

(10) Patent No.: US 7,357,742 B2
(45) Date of Patent: Apr. 15, 2008

(54) PLATE-LINK CHAIN

(75) Inventors: Uwe Wagner, Bühl (DE); André Teubert, Bühl (DE); Andreas Triller, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 668 days.

(21) Appl. No.: 10/805,180

(22) Filed: Mar. 20, 2004

(65) Prior Publication Data

US 2004/0248682 A1  Dec. 9, 2004

(30) Foreign Application Priority Data

Mar. 21, 2003 (DE) ................ 103 12 575

(51) Int. Cl.
*F16G 5/20* (2006.01)
*F16G 13/02* (2006.01)
*F16G 13/04* (2006.01)

(52) U.S. Cl. .................... 474/215; 474/202

(58) Field of Classification Search ........ 474/201, 474/206, 214–217, 229, 245, 202
See application file for complete search history.

(56) References Cited

U.S. PATENT DOCUMENTS

| | | | | |
|---|---|---|---|---|
| 1,755,887 | A * | 4/1930 | Morse | 474/216 |
| 4,581,001 | A * | 4/1986 | Rattunde et al. | 474/214 |
| 5,026,331 | A * | 6/1991 | Sugimoto et al. | 474/214 |
| 6,135,908 | A * | 10/2000 | Greiter | 474/215 |
| 6,346,058 | B1 * | 2/2002 | Linnenbrugger et al. | 474/215 |
| 6,406,396 | B1 * | 6/2002 | Turner | 474/242 |
| 6,478,704 | B1 * | 11/2002 | Greiter | 474/229 |
| 2005/0209035 | A1 * | 9/2005 | Oberle et al. | 474/206 |

* cited by examiner

*Primary Examiner*—Marcus Charles
(74) *Attorney, Agent, or Firm*—Alfred J. Mangels

(57) ABSTRACT

Rolling surfaces of rocker pressure members of plate-link chains for conical disk transmissions are constructed as freeform surfaces in such a way that their radius of curvature changes in a direction transverse to the longitudinal extent of the rocker pressure members and/or the thickness in the longitudinal direction of the rocker pressure members changes. In that way, the acoustic properties and the wear behavior of the plate-link chains can be improved.

8 Claims, 5 Drawing Sheets

PLATE-LINK CHAIN

The invention concerns a plate-link chain for a belt-driven, conical pulley transmission, as well as a rocker pressure member for such a plate-link chain.

Belt-driven, conical pulley transmissions, which permit a continuous change in transmission ratio through opposite changes in the spacing of the conical disks of two conical disk pairs around which a plate-link chain rotates, are being increasingly installed in passenger cars because of the riding comfort that is attainable with them, and on the ground of the savings in fuel consumption that is attainable because of good transmission efficiency.

Figure 1:
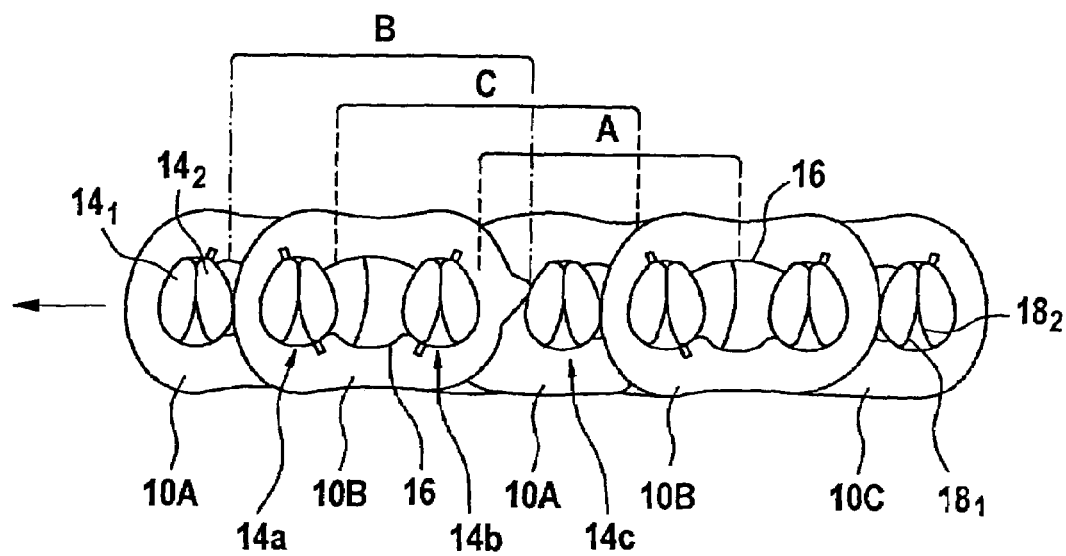
Figure 2:
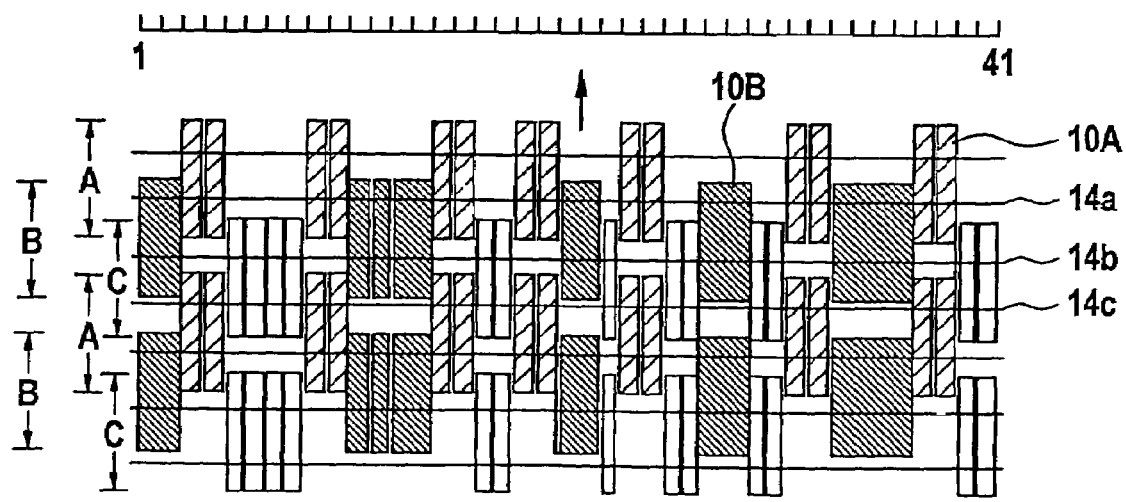
Figure 3:
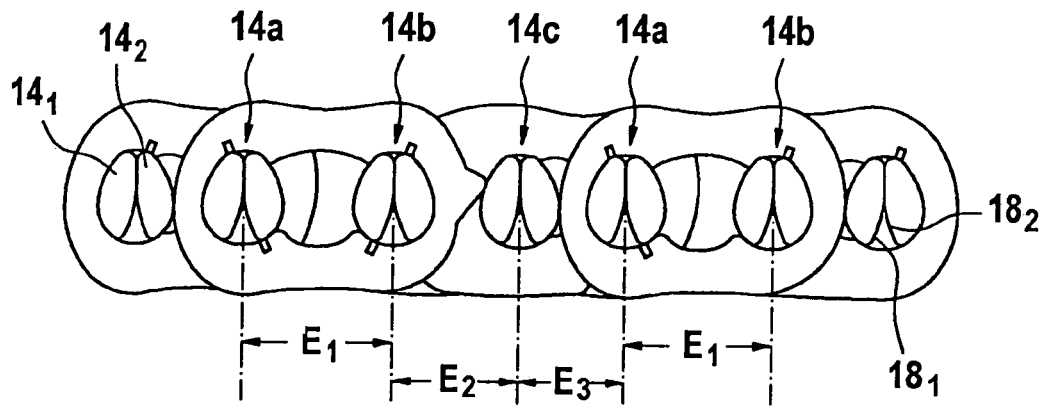
Figure 3:
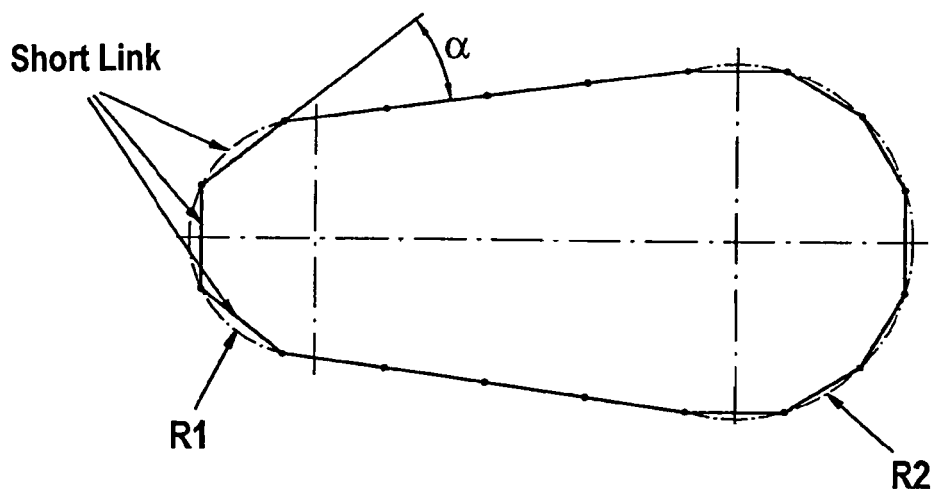
Figure 4:
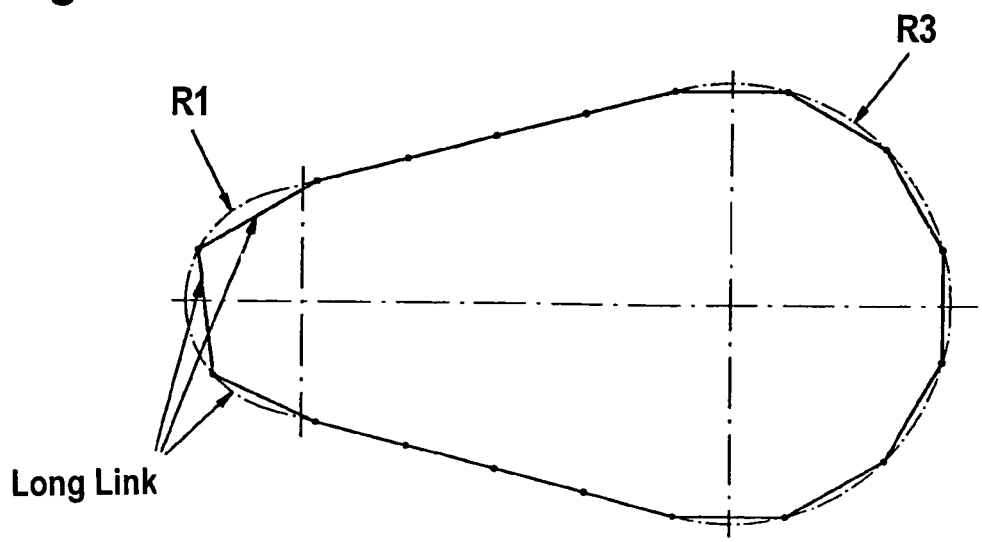
Figure 5:
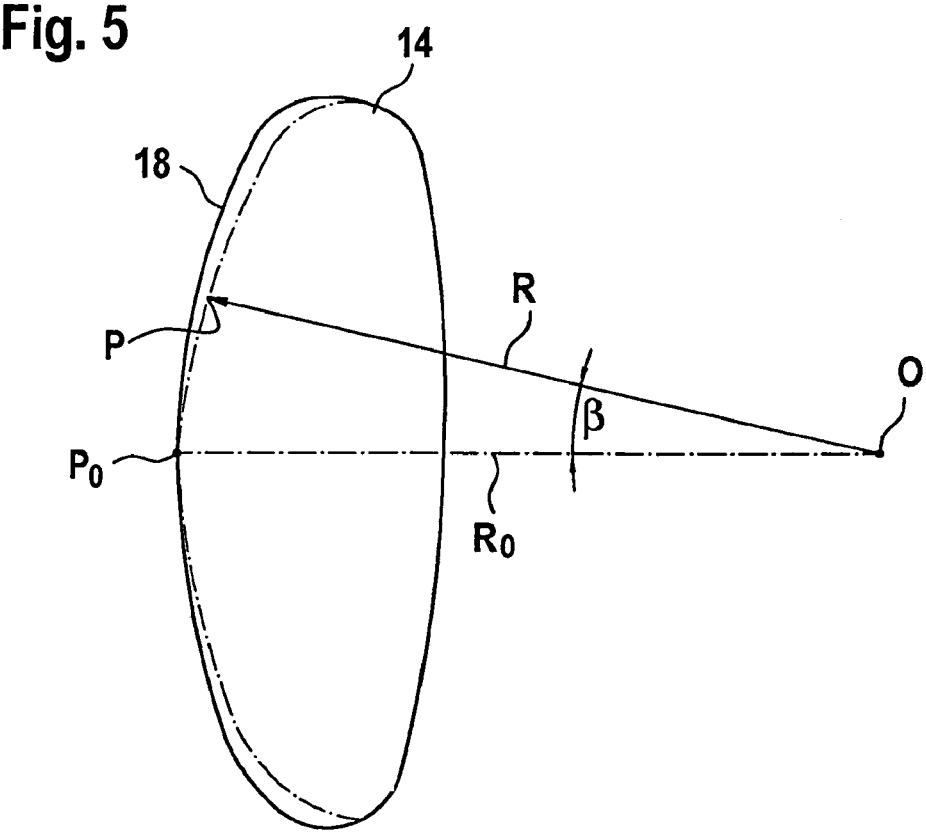
Figure 6:
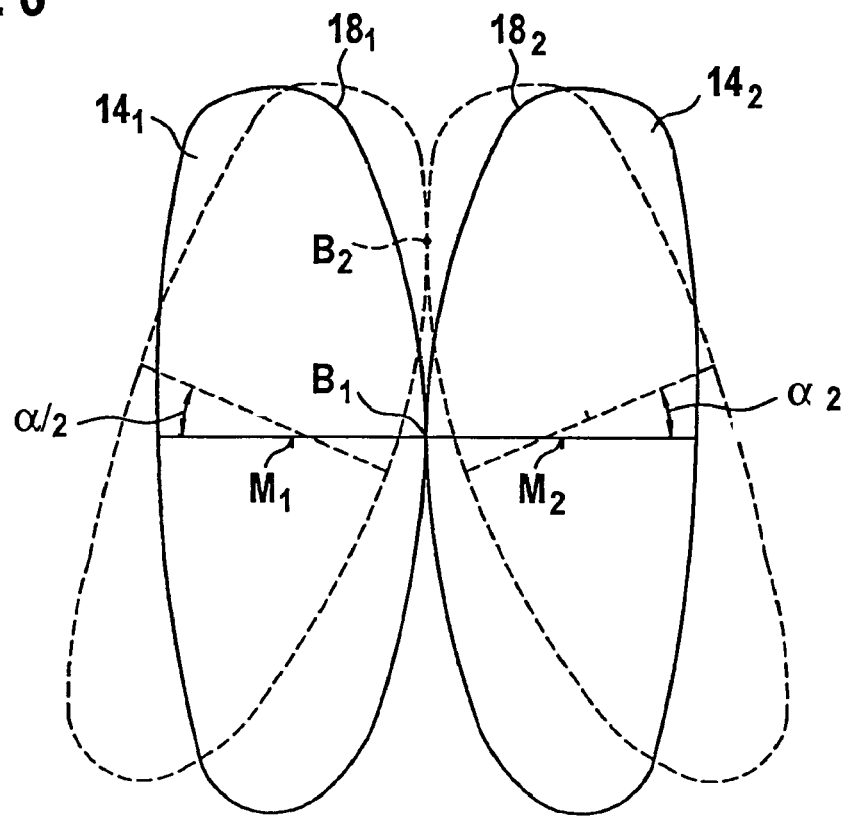
Figure 7:
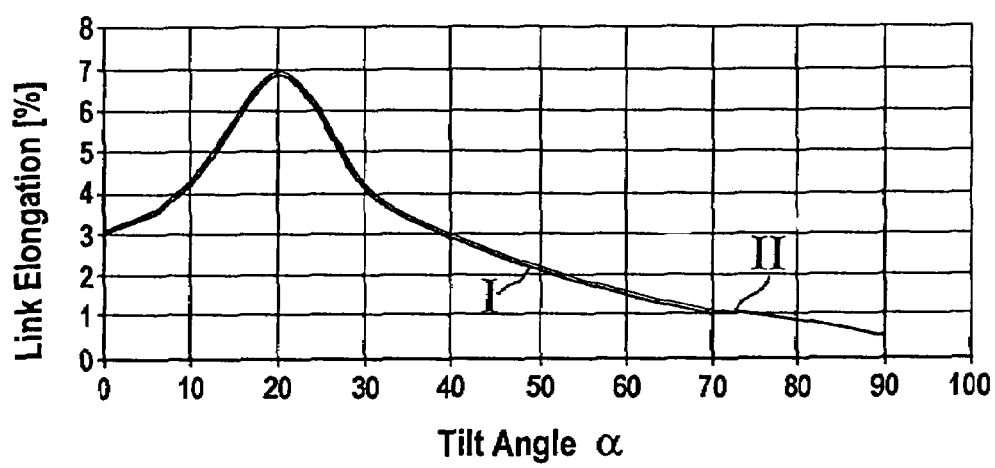
Figure 8:
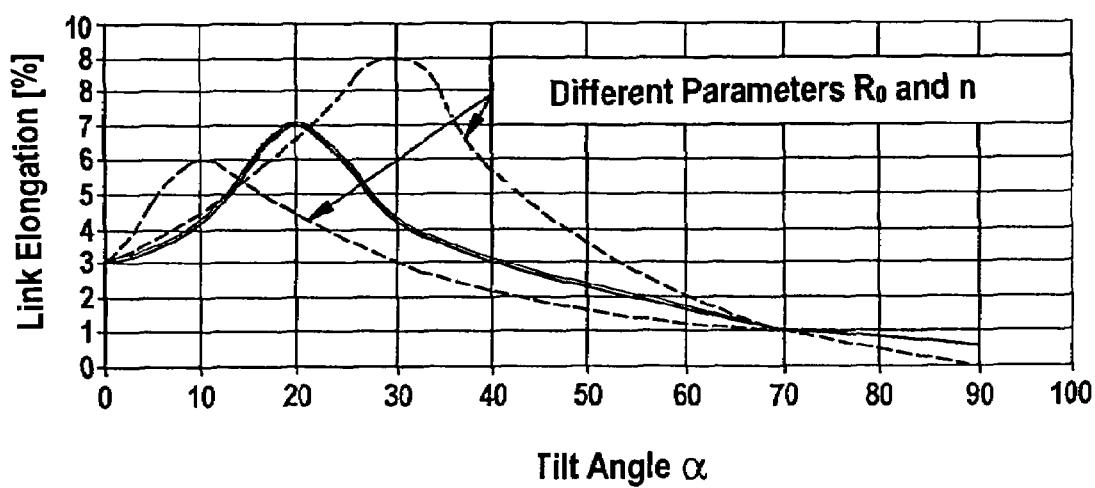
Figure 9:
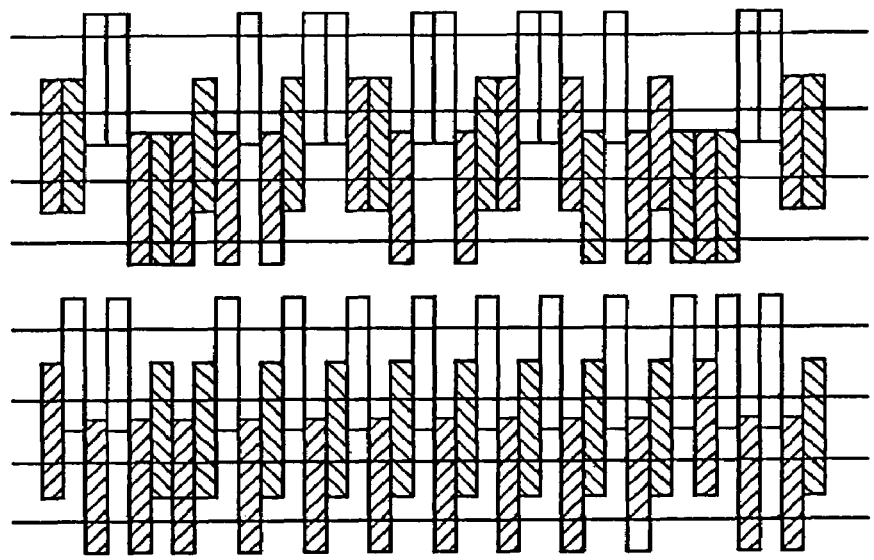
Figure 10:
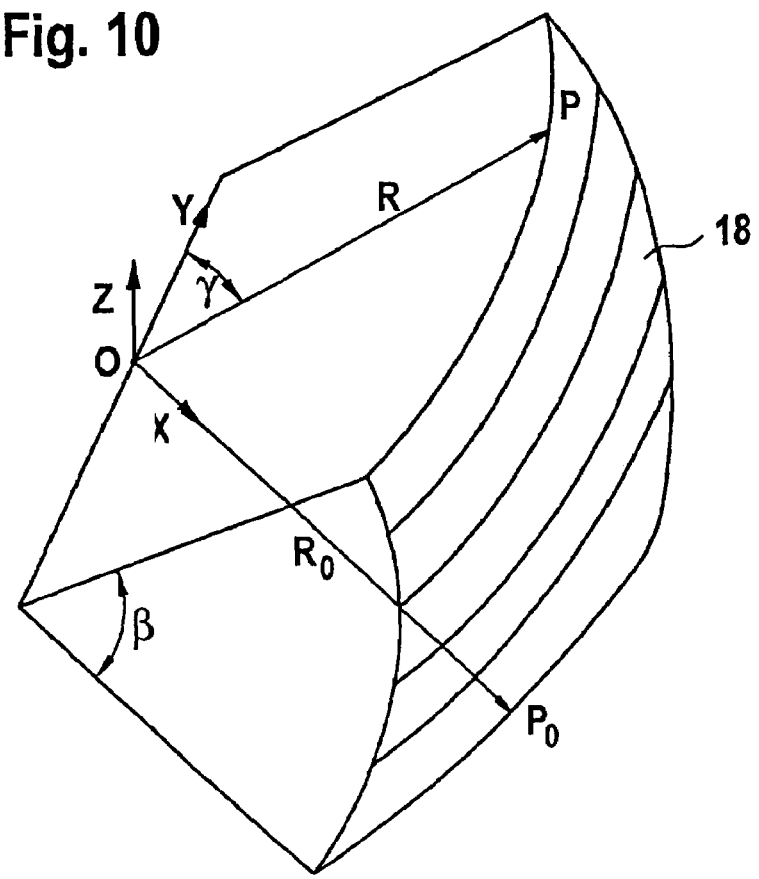

The state of the art and the invention are described below on the basis of schematic drawings in which is shown:

FIG. 1 a side view of a section of a plate-link chain,

FIG. 2 a plan view of the plate-link chain in accordance with FIG. 1,

FIG. 3 a side view of a plate-link chain modified relative to FIG. 1,

FIG. 4 side views of two circulating plate-link chains,

FIG. 5 a cross-section through a rocker pressure member,

FIG. 6 cross-sectional views of rocker pressure members rolling on each other,

FIG. 7 a curve that indicates link elongation as a function of the tilt angle for a known plate-link chain, FIG. 8 link elongation curves that are achievable with rolling surfaces formed in accordance with the invention, FIG. 9 views of sections of different plate-link chains and FIG. 10 a perspective view of a section of a rolling surface.

FIG. 1 shows a side view of a section of a known plate-link chain and FIG. 2 depicts a schematic view of the plate-link chain in accordance with FIG. 1. Such a plate-link chain is composed of plate links 10 that are arranged in rows arranged alongside one another relative to the longitudinal direction of the plate-link chain, 41 rows in the example shown, arranged one after the other in a predetermined pattern. The links of at least some adjacent rows are offset relative to one another in the longitudinal direction of the plate-link chain, so that a connection of the links is brought about by transverse pins or rocker pressure member pairs 14 that penetrate the plate-link chain and penetrate at least two links arranged offset relative to each other in the longitudinal direction. More precisely, one rocker pressure member pair 14a penetrates links 10A and links 10B; one rocker pressure member pair 14b penetrates links 10B and 10C; one rocker pressure member pair 14c penetrates links 10C and once again link 10A, whereupon the arrangement is repeated. The rocker pressure member pair 14a penetrates link 10B in such a way that it is arranged in the running direction of the plate-link chain (the direction of the arrow) on the front end of an opening 16 of the links, whereas it is arranged on the back end of the openings of links 10A in the running direction of the plate-link chain. It is applicable analogously for the other rocker pressure member pairs. In that way, the forward outer surfaces of the front rocker pressure member of rocker pressure member pair 14a in the direction of travel is supported on the front end of opening 16 of links 10B, whereas the outer surface of the rear rocker pressure member $14_2$ of the rocker pressure member pair 14a is supported on the back end of the opening 16 of links 10A. The openings and rocker pressure members are shaped in such a way that the rocker pressure members are non-rotatably held on the respective associated end surfaces of the openings. When the chain bends, the engaged surfaces $18_1$ and $18_2$ of the rocker pressure members of a rocker pressure member pair roll against each other so that a substantially friction-free flexibility of the plate-link chain is provided. Constructing those rolling surfaces $18_1$ and $18_2$ with constant radii is known.

The end faces of the rocker pressure member pairs projecting laterally out of the plate-link chain form contact surfaces which come into contact with the conical surfaces of the conical disks of each conical disk pair and enables as slip-free a friction contact as possible between the plate-link chain and the conical disk pairs so that torque can be transmitted. So that if possible no excess noise is generated due to resonance when the end faces of the rocker pressure member pairs 14 come into contact with the conical surfaces, it is advantageous to arrange at least two of the identical links 10A, 10B, and 10C, which are arranged offset relative to one another in the longitudinal direction of the plate-link chain, with different lengths, that is, for example, constructing link 10B longer than links 10A and 10C. In that way, the spacing $E_1$ between the link pairs 14a and 14b in FIG. 3 will be greater than the spacing $E_2$ between link pairs 14b and 14c and the spacing $E_3$ between link pairs 14c and 14a. It is obvious that different sequences are possible with links constructed with different lengths in the longitudinal direction of the plate-link chain, and a large number of different link lengths can be utilized.

The construction of the plate-link chain from links with differing lengths leads to a change in the effective length of the plate-link chain, that is, the length measured along the rocker pressure member pairs, as a function of how many long or short links precisely rotate at a specified radius on a conical disk pair, changes because of the so-called polygon effect. That can lead to vibrations, which disadvantageously influence the operating behavior of the belt-driven, conical pulley transmission and its useful life.

The polygon effect is explained on the basis of FIG. 4. Upper FIG. 4 shows a plate-link chain containing short links, which pass around a left-side conical disk pair with an effective radius R1 and pass around a right-side conical disk pair with an effective radius R2. The ratio of the radii determines the momentary transmission ratio of the belt-driven, conical pulley transmission. As is apparent, the links form a polygonal course, which better approaches a circular arc the shorter the links are.

In lower FIG. 4 the course of a chain is represented that has the same length in the extended condition as the plate-link chain in accordance with upper FIG. 4, but which contains longer links. The deflection or tilt angle between adjacent links is designated as α. As is apparent, the polygonal course containing the longer links approximates a circular arc with the radius R1 less than the polygonal course containing short links, so that the plate-link chain containing longer links increases its effective length more when passing around radius R1 than the plate-link chain of short links. Correspondingly, the lower plate-link chain containing longer links runs on a radius R3 on the other conical disk pair, wherein radius R3 is greater than radius R2. With a plate-link chain having successive short and long links, the effective length of the plate-link chain or the transmission ratio of the belt-driven, conical pulley transmission consequently depends upon how many short and long links are respectively situated at a radius of a conical disk pair. This leads to the excitation of vibrations in the belt-driven, conical pulley transmission.

A further vibratory excitation of known rocker pressure members composed of circular cylindrical rolling surfaces $18_1$ and $18_2$ lies in the fact that with the curvature of the plate-link chain, or the resulting rolling contact of the rolling surfaces $18_1$ and $18_2$ on each other, the effective distance between the associated support surfaces on the inner sides of the openings 16 of the links (FIG. 1), and therewith the distance between successive links, changes, which leads, in turn, to a change in the chain length as a consequence.

The above-mentioned effect of the rolling contact of the rolling surfaces on one another is explained on the basis of FIGS. 5 and 6.

FIG. 5 shows a cross section through a known rocker pressure member 14, for example the rocker pressure member 14$_i$ in FIG. 3. The rolling surface, which is a circular cylindrical surface with the radius of curvature $R_0$ and the center of curvature O, is designated by 18.

FIG. 6 shows in solid lines two rocker pressure members 14$_1$ and 14$_2$ of an extended plate-link chain (not shown). Both rolling surfaces 18$_1$ and 18$_2$ come into contact with each other at point B1. The inner surface of a link opening that faces toward the left in as viewed in FIG. 6 is supported on the surface of the rocker pressure member 14$_2$ that lies opposite to the rolling surface 18$_2$. The inner surface of a link opening that faces toward the right as viewed in FIG. 6 is supported on the surface of rocker pressure member 14$_1$ that lies opposite to surface 18$_1$, as is clear from FIG. 3. When both links are tilted relative to each other, they take the rocker pressure members 14$_1$ and 14$_2$ along with them, so that their opposed rolling surfaces 18$_1$ and 18$_2$ roll against each other, and the point of contact B1 (or the contact line) moves toward contact point B2. The tilted state of the rocker pressure members is shown in dashed lines, whereby their individual tilt relative to the initial position is α/2 so that the total tilt angle (FIG. 4) is α. As is apparent from FIG. 6, the centers M1 and M2 of the rocker pressure member cross sections move apart from each other upon tilting. Collectively, in that way an effective link elongation results as a function of tilt angle α, as it is represented in FIG. 7. The elongation begins in the illustrated example at a tilt angle from 0 to 3°, since when the plate-link chain is extended the rocker pressure members are situated in an orientation relative to each other in which they touch outside the longitudinal mid-plane of the plate-link chain. In that way greater bend angles are possible.

It should be pointed out that the representations of FIGS. 5 and 6 are only exemplary. The rocker pressure members can be formed in such a way that they end shortly below the contact line B1, so that the entire rolling surface is utilized in the rotation path of the plate-link chain, which is curved in one direction when rotating about the conical disk pair (in accordance with FIG. 6, the conical disks are above the rocker pressure members represented; in FIG. 3, they are underneath).

Curve I of FIG. 7 represents the conditions for shorter links and ends with a tilt angle α of about 70%. Curve II extends to a tilt angle of 70% approximately congruently with curve I and represents the conditions for longer links, with which greater tilt angles can be achieved, as is apparent from FIG. 4.

A further problem that arises repeatedly in connection with plate-link chains is that the rocker pressure members are unequally stressed over the width of the plate-link chain, that is, their own length. With different link arrangements or connections, as they are represented in FIGS. 2 and 9 by way of example, configuring the plate-link chain in such a way that similarly high forces are transmitted through links arranged in the middle of the plate-link chain, or the corresponding rolling surfaces of the rocker pressure members, as are transmitted through links arranged on the edges of the plate-link chain was tried. That was not achieved. In practice, a smaller force is transmitted through the middle links than through the side links in substantially all connections.

The invention is based upon the object of producing remedies for the problems identified above.

A first solution of the object of the invention is achieved with a plate-link chain that is composed of links and rocker pressure member pairs that extend transversely through the plate-link chain, which are arranged in several rows one after the other relative to the transverse direction of the plate-link chain, whereby each link is penetrated by two rocker pressure member pairs, one following the other in the longitudinal direction of the plate-link chain. Each rocker pressure member pair penetrates at least two links of different rows offset relative to each other in the longitudinal direction of the plate-link chain. Surfaces of rocker pressure member pairs facing away from each other in the longitudinal direction of the plate-link chain are in contact with opposite end sides of openings of links that are offset relative to each other. Surfaces of the rocker pressure members of a rocker pressure member pair facing each other form rolling surfaces on which the rocker pressure members roll on each other when the plate-link chain is curved, and lateral end faces of the rocker pressure member pairs are formed for contact on conical surfaces of the conical disk pairs. The plate-link chain is characterized in that the rolling surfaces of the rocker pressure members are formed as freeform surfaces in such a way that changes in the spacing between centers of cross sections of rocker pressure members rolling on one another during a mutual tilting of successive links in the longitudinal direction of the plate-link chain are at least partially compensated.

A further solution of the object of the invention is achieved with a plate-link chain that is composed of links and rocker pressure member pairs that extend transversely through the plate-link chain, which are arranged in several rows one after the other relative to the transverse direction of the plate-link chain, whereby each link is penetrated by two rocker pressure member pairs, one following the other in the longitudinal direction of the plate-link chain. Each rocker pressure member pair penetrates at least two links of different rows offset relative to each other in the longitudinal direction of the plate-link chain, surfaces of rocker pressure member pairs facing away from each other in the longitudinal direction of the plate-link chain are in contact with opposite end sides of openings of links that are offset relative to each other, surfaces of the rocker pressure members of a rocker pressure member pair facing each other form rolling surfaces on which the rocker pressure members roll on each other when the plate-link chain is curved, and lateral end faces of the rocker pressure member pairs are formed for contact on conical surfaces of the conical disk pairs, and the links of at least one of the adjacently arranged rows have different lengths so that the distance between the end faces of the rocker pressure members is different, which plate-link chain is characterized in that the rolling surfaces of the rocker pressure members are constructed as freeform surfaces, that the influence of the length of the links on the shortening of the effective chain length during rotation about a circular arc (polygon effect) is at least partially compensated.

A further solution of the object of the invention is achieved with a plate-link chain that is composed of links and rocker pressure member pairs that extend transversely through the plate-link chain, which are arranged in several rows one after the other relative to the transverse direction of the plate-link chain, whereby each link is penetrated by two rocker pressure member pairs, one following the other in the longitudinal direction of the plate-link chain, each rocker pressure member pair penetrates at least two links of different rows offset relative to each other in the longitudinal direction of the plate-link chain, surfaces of rocker pressure member pairs facing away from each other in the longitudinal direction of the plate-link chain are in contact with opposite end sides of openings of links that are offset relative to each other, surfaces of the rocker pressure members of a rocker pressure member pair facing each other form rolling surfaces on which the rocker pressure members roll on each other when the plate-link chain is curved, and lateral end faces of the rocker pressure member pairs are formed for contact on conical surfaces of the conical disk pairs, which plate-link chain is characterized in that the rolling surfaces of the rocker pressure members are formed as freeform surfaces, that differences present over the width of the plate-link chain between forces transmitted through the rocker pressure member pairs between the links are at least partially compensated.

The above-mentioned plate-link chains have in common that the rolling surfaces of their rocker pressure members are constructed as freeform surfaces, with which the problems of known plate-link chains described in the beginning can be eliminated.

Rocker pressure members, as they can be utilized for the above-mentioned plate-link chain, are characterized in accordance with the invention in that the rolling surfaces can be described by the formula $R=R_0 \times f(\beta)$, wherein $R_0=$the radius of curvature of the rolling surface at a point $P_0$ of a cross-sectional plane that extends longitudinally through the rocker pressure member and perpendicular to a reference plane containing the center of curvature $0$, and R is the distance between the center of curvature $0$ and a point P in the cross-sectional plane, whereby a straight line through $0$ and $P_0$ and a straight line through $0$ and P form an angle $\beta$ with each other, and $f(\beta)$ is a function which for $\beta$ different from zero is not equal to one. For the case that $\beta$ is less than zero, the absolute value of $\beta$ is utilized.

An advantageous example for the function $f(\beta)$ is: $f(\beta) = \cos^n(\beta)$, whereby n is a positive number.

The above-mentioned rocker pressure members are formed in such a way that their cross section is constant over their entire length, that is, the entire width of the plate-link chain.

If the effect is to be equalized that smaller forces are transmitted through the rocker pressure members in the central region of the plate-link chain than in the outer regions, the rocker pressure members of the invention are formed in such a way that the rolling surface is a freeform surface of the type that the rocker pressure member is thicker in its middle region than in its end region, relative to the width of the plate-link chain.

Advantageously, the rolling surface of such a rocker pressure member can be described by the formula $R=R_0 \times f(\gamma)$, whereby $R_0$ is the radius of curvature of the rolling surface at a point $P_0$ of a cross-sectional plane through the center of the rocker pressure member, which cross-sectional plane extends longitudinally through the rocker pressure member perpendicular to a reference plane containing the center of curvature O, R is the distance between the center of curvature and a point on the rolling surface, $\gamma$ is the angle between the connecting straight line OP and the longitudinal direction of the rocker pressure member, and $f(\gamma)$ is a function which for values different from 90 degrees $\gamma<1$.

A further development of the above-mentioned rocker pressure member is characterized in that the rolling surface can be described by the formula $R=R_0 \times \sin^n \gamma \times \cos^m \beta$, wherein n and m are positive numbers and $\beta$ is the angle between the reference plane and a longitudinal direction plane of the rocker pressure member containing the straight line OP.

The rolling surfaces of the rocker pressure members formed in accordance with the invention are not formed as segments of a circular cylinder, but as freeform surfaces, which are formed corresponding to the conditions of the plate-link chain (link length; minimal and maximal radii (see FIGS. 4A and 4B); link connection; stresses).

In FIG. 5 an example of a rolling surface formed in accordance with the invention is indicated by dashed lines, whereby the cross section of the rocker pressure members in that example is equal over their entire length. As is apparent, the distance that a point P (or a line) has from the point O (or a line), which is the center of curvature of the radius of curvature $R_0$ that the rolling surface 18 has at point $P_0$, changes with the angle $\beta$. In the illustrated example, the distance R becomes smaller with an increasing angle $\beta$, so that during rolling of the rocker pressure member pairs 14, the increase in distance between the centers of the rocker pressure members that roll on each other is reduced. According to the requirements, the distance R can also increase with increasing $\beta$, or first increase and then decrease, or the opposite.

FIG. 8 shows examples of link elongation curves as they can be achieved with $R=R_0 \times \cos^n(\beta)$. Through the variation of $R_0$ and the exponent n, the maxima, the position of the maxima, and the increases can be changed.

It is apparent that it is not essential that the plane in which $R_0$ and $P_0$ lie be the transverse central plane of the rocker pressure member, so that the rocker pressure member can be formed asymmetrically relative to the transverse center plane.

The function $f(\beta)$ can have a very different analytic form, for example $(1-\sin \beta)$ with very different exponents and so forth. Overall, the rolling surfaces can be designed in such a way that chain length changes as a result of different tilt angles between the links can be equalized, or the tilt-angle-dependent chain elongation can be adjusted in such a way that it has a damping effect for vibrations arising from the chain circulation. In that way the mechanical stresses of the chain are reduced so that besides improving the acoustic properties, the working life is increased.

FIG. 10 shows a section of a rolling surface 18 of a rocker pressure member 14 that is utilized for compensation of different forces transmitted through the rocker pressure members in the central region and the side regions of a plate-link chain. A cross-sectional plane through the center of the rocker pressure member is fixed by the coordinate directions X and Z. O is the center of curvature of the intersection between the cross-sectional center plane and the rolling surface 18, wherein the radius of curvature is $R_0$. Y designates the longitudinal direction of the rocker pressure member, which runs transversely through the plate-link chain. X and Y fix a reference plane, which extends through point $P_0$ lying in the cross-sectional center plane, which, for example, forms the contact point between two adjacent rolling surfaces contacting each other when the plate-link chain is extended.

Each point P on the rolling surface 18 can be described by three coordinates, namely its distance R from point O, the angle $\gamma$ between the straight lines OP and Y, as well as the angle $\beta$ between the reference plane and the straight line OP and the plane containing the coordinate axis Y.

If R is independent of $\beta$, the rolling surface 18 can be configured in such a way that its transverse cross sections have a respective constant radius of curvature, but the cross-sectional surfaces nonetheless change, preferably decrease, on both sides of the cross-sectional center plane. Generally for R, $R=R_0 \times f(\gamma)$. If the rocker pressure members are thicker in the center regions than at the ends, the transfer of force toward the center increases, so that in comparison with conventional plate-link chains an equalization is achieved.

Especially advantageous is a configuration of the rolling surfaces in such a way that $R=R_0 \times \sin^n \gamma \times \cos^m \beta$ holds true, whereby n and m are positive numbers. With that configuration of the rolling surfaces, both the stresses of the rocker pressure members over the width of the plate-link chain can be equalized and the disadvantageous effects caused by the curvature of the plate-link chain can be minimized. By the equalization of the force transmission, the stress of the individual rocker pressure members on each other is compensated, whereby the peak stresses of the rocker pressure members are reduced, the chain as a body becomes softer so that torque impulses are damped, and the total wear of the chain is reduced.

What is claimed is:

1. A plate-link chain for a conical disk transmission, said plate-link chain comprising: a plurality of links that extend transversely through the plate-link chain, a plurality of rocker pressure member pairs that are arranged one pair after another pair in rows relative to the transverse direction of the plate-link chain, whereby each link is penetrated by two rocker pressure member pairs, one pair following after the other pair in the longitudinal direction of the plate-link chain, each rocker pressure member pair penetrating at least two links of different rows of links offset relative to each other in the longitudinal direction of the plate-link chain, wherein first surfaces of rocker pressure member pairs that face away from each other in the longitudinal direction of the plate-link chain are in contact with oppositely-facing end surfaces of inner openings of links that are offset from one another, wherein second surfaces of the rocker pressure members of a rocker pressure member pair that face each other and form include rolling surfaces upon which contacting rocker pressure members roll against each other when the plate-link chain assumes a curved shape, and lateral end faces of the rocker pressure member pairs are adapted for contact with conical surfaces of conical disk pairs, wherein the rolling surfaces of the rocker pressure members are formed as freeform surfaces having a varying radius of curvature so that changes in a distance between centers of transverse cross sections of rocker pressure members rolling against one another during a mutual tilting of links following one after the other in the longitudinal direction of the plate-link chain are reduced.

2. A plate-link chain for a conical disk transmission, said plate-link chain comprising: a plurality of links that extend transversely through the plate-link chain, a plurality of rocker pressure member pairs that are arranged one pair another pair in rows relative to the transverse direction of the plate-link chain, whereby each link is penetrated by two rocker pressure member pairs, one pair following after the other pair in the longitudinal direction of the plate-link chain, each rocker pressure member pair penetrating at least two links of different rows of links offset relative to each other in the longitudinal direction of the plate-link chain, wherein first surfaces of rocker pressure member pairs that face away from each other in the longitudinal direction of the plate-link chain are in contact with oppositely-facing end surfaces of inner openings of links that are offset from one another, wherein second surfaces of the rocker pressure members of a rocker pressure member pair that face each other include rolling surfaces upon which contacting rocker pressure members roll against each other when the plate-link chain assumes a curved shape, and lateral end faces of the rocker pressure member pairs are adapted for contact with conical surfaces of conical disk pairs, wherein links of at least some adjacent rows of links have different lengths so that distances between outwardly-facing end surfaces of adjacent rocker pressure member pairs are different in a longitudinal direction of the chain, wherein the rolling surfaces of the rocker pressure members are formed as freeform surfaces having a varying radius of curvature so that the influence of the length of the links on a shortening of the effective chain length during rotation in a circular arc is reduced.

3. A plate-link chain for a conical disk transmission, said plate-link chain comprising: a plurality of links that extend transversely through the plate-link chain, a plurality of rocker pressure member pairs that are arranged one pair after another pair in rows relative to the transverse direction of the plate-link chain, whereby each link is penetrated by two rocker pressure member pairs, one pair following after the other pair in the longitudinal direction of the plate-link chain, each rocker pressure member pair penetrating at least two links of different rows of links offset relative to each other in the longitudinal direction of the plate-link chain, wherein first surfaces of rocker pressure member pairs that face away from each other in the longitudinal direction of the plate-link chain are in contact with oppositely-facing end surfaces of inner openings of links that are offset from one another, wherein second surfaces of the rocker pressure members of a rocker pressure member pair that face each other include rolling surfaces upon which contacting rocker pressure members roll against each other when the plate-link chain assumes a curved shape, and lateral end faces of the rocker pressure member pairs are adapted for contact with conical surfaces of conical disk pairs, wherein the rolling surfaces of the rocker pressure members are formed as freeform surfaces having a varying radius of curvature in a longitudinal direction of the rocker members so that differences in forces transmitted by the rocker pressure member pairs between the links over the width of the plate-link chain are reduced.

4. A rocker pressure member for a plate-link chain, wherein the rocker pressure member is an elongated member, said rocker pressure member comprising: a first longitudinally-extending outer surface defining a plate-link contact surface, and a second longitudinally-extending outer surface defining a curved rolling surface, wherein the rolling surface has a varying radius of curvature in a transverse cross-sectional plane of the rocker member and is described by the formula $R=R_0 \times f(\beta)$, wherein $R_0$=the radius of curvature of the rolling surface at a point $P_0$ of a cross-sectional plane, which extends longitudinally through the rocker pressure member and perpendicular to a transverse reference plane containing the center of curvature O, and R=the distance between the center of curvature O and a point P in the cross-sectional plane, wherein a straight line through O and $P_0$ and a straight line through O and P form an angle $\beta$ with each other, and $f(\beta)$ is a function that does not equal one for $\beta$ different from zero.

5. A rocker pressure member according to claim 4, wherein $f(\beta)=\cos^n(\beta)$, with n a positive number.

6. A rocker pressure member for a plate-link chain according to claim 4, wherein the rolling surface is a freeform surface such that the rocker pressure member is thicker in its middle region than in its end regions relative to the width of the plate-link chain.

7. A rocker pressure member according to claim 6, wherein the rolling surface is described by the formula $R=R_0 f(\gamma)$, wherein $R_0$=the radius of curvature of the rolling surface at a point $P_0$ of a cross-sectional plane through the center of the rocker pressure member, which cross-sectional plane extends longitudinally through the rocker pressure member and is perpendicular to a transverse reference plane containing the center of curvature O, and $R$=the distance between the center of curvature O and a point P on the rolling surface, and $\gamma$=the angle between a straight line connecting O and P and the longitudinal direction of the rocker pressure member.

8. A rocker pressure member according to claim 7, wherein the rolling surface is described by the formula $R=R^0 \times \sin^n \gamma \times \cos^m \beta$, wherein n and m are positive numbers.

* * * * *